United States Patent [19]

Pakull et al.

[11] Patent Number: 4,931,534
[45] Date of Patent: Jun. 5, 1990

[54] THERMOTROPIC AROMATIC POLYESTERS, A PROCESS FOR THEIR PRODUCTION AND THEIR USE FOR THE PRODUCTION OF MOLDINGS, FILAMENTS, FIBERS AND FILMS

[75] Inventors: Ralf Pakull; Volker Eckhardt; Joachim Genz; Karsten Idel, all of Krefeld; Hans-Rytger Kricheldorf; Volker Döring, both of Hamburg, all of Fed. Rep. of Germany

[73] Assignee: Bayer Aktiengesellschaft, Leverkusen-Bayerwerk, Fed. Rep. of Germany

[21] Appl. No.: 343,345

[22] Filed: Apr. 26, 1989

[30] Foreign Application Priority Data

May 6, 1988 [DE] Fed. Rep. of Germany ....... 3815521

[51] Int. Cl.⁵ .................... C08G 63/02; C08G 63/18; C08G 63/68
[52] U.S. Cl. .................................. 528/193; 528/176; 528/191
[58] Field of Search ..................... 528/176, 191, 193

[56] References Cited

U.S. PATENT DOCUMENTS 3,148,209  9/1964  Jason et al. ........................ 562/432
3,515,696  6/1970  Tsuji .................................... 528/193
4,294,955  10/1981 Harris, Jr. ........................... 528/193

FOREIGN PATENT DOCUMENTS 0170935  2/1986  European Pat. Off. .

OTHER PUBLICATIONS

Patent Abstracts of Japan, vol. 9, Aug. 16, 1985, Number 200.
Makromol. Chem. 189, "New Polymer Synthesis, 30[a)]", pp. 1437-1446, 1988.
Makromol. Chem. 189, "New Polymer Synthesis, 29[a)]", pp. 1425-1435, 1988.

Primary Examiner—Harold D. Anderson
Assistant Examiner—T. Mosley
Attorney, Agent, or Firm—Connolly, Bove, Lodge & Hutz

[57] ABSTRACT

The thermotropic aromatic polyesters according to the invention which contain recurring units corresponding to the following formulae

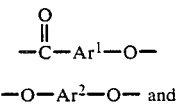

$-O-Ar^2-O-$ and

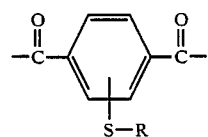

show improved resistance to chemicals, low melting points and, hence, good processibility in addition to the well-known favorable mechanical properties of liquid-crystal materials. The thermotropic aromatic polyesters are used for the production of moldings, filaments, fibers and films.

7 Claims, No Drawings

THERMOTROPIC AROMATIC POLYESTERS, A PROCESS FOR THEIR PRODUCTION AND THEIR USE FOR THE PRODUCTION OF MOLDINGS, FILAMENTS, FIBERS AND FILMS

This invention relates to high molecular weight, hardenable, thermotropic aromatic polyesters showing excellent mechanical properties and good processibility, to a process for their production and to their use for the production of moldings, filaments, fibers and films.

"Thermotropic" substances are substances which form liquid crystal melts. Thermotropic polyesters are already known. A summary of relevant literature can be found in DE-OS 33 25 787 and in EP-OS 134 959 where an investigation of the liquid crystal state of polymer melts is also described.

Thermotropic polyesters can be molded as thermoplastics to form moldings and films and can be spun from the melt to form filaments and fibers showing outstanding mechanical properties. However, this presupposes that the polyesters can be melted without decomposing.

The most simple fully aromatic polyesters, such as poly-(4-hydroxybenzoate) and poly-(1,4-phenylene terephthalate), do not satisfy these requirements. These polyesters melt under decomposition at around 600° C.

DE-OS 2 025 971 describes high molecular weight, fully aromatic polyesters based on p-hydroxybenzoic acid, aromatic dicarboxylic acids, such as terephthalic or isophthalic acid, and diphenols, such as hydroquinone or 4,4'-dihydroxydiphenyl. These polyesters are thermotropic by virtue of the components used. They may be processed, for example, to fibers. The disadvantage of most of the polyesters described is, above all, that their melting points are still too high, so that their processing involves greater technical outlay.

JP 6 069 132 describes high molecular weight, linear, fully aromatic polyesters based on aromatic dicarboxylic acids, such as terephthalic acid or phenoxyterephthalic acid, and diphenols. In view of their high melting points, however, the described polyesters can only be processed after the addition of large amounts of an inert solvent which has to be removed by extraction after the processing step. This process is therefore uneconomical.

The resistance to chemicals of standard fully aromatic polyesters is too low for certain applications (for example in plant manufacture). This imposes narrow limits on the use of such polyesters.

Accordingly, the object of the present invention is to provide thermotropic, linear, aromatic polyesters which show improved resistance to chemicals and which, in addition to the well-known favorable mechanical properties of liquid-crystal materials, also show low melting points and, hence, good processibility.

It has now surprisingly been found that linear thermotropic polyesters containing co-condensed residues of substituted terephthalic acids show this desirable combination of advantageous properties.

The present invention relates to thermotropic, aromatic polyesters containing recurring units corresponding to the following formulae

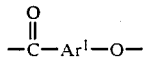  (I)

—O—Ar²—O— and  (II)

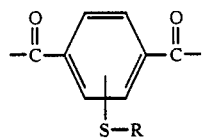  (III)

in which
Ar¹ and Ar² are difunctional aromatic radicals containing 8 to 16 carbon atoms, in which at least 90 mol-% of the chain-extending bonds are coaxially or parallel-opposed and at most 10 mol-% are angled, these radicals optionally being substituted by 1 to 4 $C_1$–$C_4$ alkoxy groups, preferably methoxy groups, and/or by 1 to 4 halogen atoms, preferably chlorine, bromine, and R is an aryl radical containing 6 to 18 carbon atoms, preferably phenyl, an alkylphenyl radical containing 7 to 11 carbon atoms, preferably p-tert.-butylphenyl, or a p-halophenyl radical, preferably p-chlorophenyl, characterized in that the molar ratio of I to II is from 0 to 85:100 to 15 and preferably from 50 to 75:50 to 25 and the molar ratio of II to III is from 1 to 0.95:1 to 1.05, preferably from 1 to 0.98:1 to 1.02 and more preferably 1.0:1.0.

Preferred structural units corresponding to general formula (III) are derived from thiophenyl terephthalic acid, p-chlorothiophenyl terephthalic acid, p-methylthiophenyl terephthalic acid or β-thionaphthyl terephthalic acid.

Up to 50 mol-% and preferably up to 20 mol-% of the recurring units of formula (III) may be replaced by other linear dicarboxylic acids. In particularly preferred compositions, the recurring units of formula (III) are not replaced by other dicarboxylic acids.

Aromatic dicarboxylic acids which may replace the recurring units of formula (III) are, for example, terephthalic acid, 2,6-naphthalene dicarboxylic acid, 1,4-naphthalene dicarboxylic acid, 1,5-naphthalene dicarboxylic acid, 4,4'-diphenyl dicarboxylic acid, 4,4'-terphenyl dicarboxylic acid, 4,4'-trans-stilbene dicarboxylic acid, 4,4'-tolane dicarboxylic acid, 4,4'-azobenzene dicarboxylic acid, methyl terephthalic acid, methoxyterephthalic acid, chloroterephthalic acid and also phenyl terephthalic acid, more especially terephthalic acid.

The polyesters according to the invention may contain mixtures of the recurring units of formula (III) described above. However, polyesters containing only one of the components mentioned as dicarboxylic acid residues are preferred.

Preferred diphenols which lead to units corresponding to formula (II) are, for example, 4,4'-dihydroxydiphenyl, hydroquinone, resorcinol and/or 4,4'-dihydroxybenzophenone, more especially 4,4'-dihydroxydiphenyl and/or hydroquinone.

Hydroxycarboxylic acids which lead to units corresponding to formula (I) are, for example, 4-hydroxybenzoic acid, 6-hydroxy-2-naphthoic acid, 4-hydroxy-1-naphthoic acid, 5-hydroxy-1-naphthoic acid, 4-hydroxy-4-biphenyl carboxylic acid, 4-hydroxy-trans-cinnamic acid, 3-chloro-4-hydroxybenzoic acid, 3-methyl-4-hydroxybenzoic acid, 3-phenyl-4-hydroxybenzoic acid, 3-methoxy-4-hydroxybenzoic acid and- /or 3-methoxy-4-hydroxycinnamic acid. 4-Hydroxybenzoic acid is particularly preferred.

Where hydroxycarboxylic acids and diphenols leading to radicals $Ar^1$ and $Ar^2$, of which the chain-extending bonds are angled, are used, the quantities in which they are used will not exceed the level beyond which the resulting polyesters would lose their thermotropic properties.

The polyesters according to the invention may contain —COOH, —OH, $OC_6H_5$, acyloxy or residues stemming from chain terminators as terminal groups. Preferred chain terminators are monofunctional aromatic hydroxyl compounds, such as 4-hydroxydiphenyl, p-nonylphenol, 4-(1,1,3,3-tetramethylbutyl)-phenol, β-naphthol, and aromatic monocarboxylic acids. Chain terminators may be used in quantities of from about 0.5 to 5 mol-%, based on diphenols in the case of monohydroxyl compounds and on dicarboxylic acids in the case of monocarboxylic acids.

It is also possible to use branching, trifunctional or higher, preferably aromatic, monomers in quantities of from about 0.1 to 1 mol-%, based on the sum of components I and II, such as phloroglucinol, 1,3,5-benzenetricarboxylic acid and 3,5-dihydroxybenzoic acid.

The polyesters according to the invention may contain up to 10 mol-% carbonate groups, based on the sum of ester and carbonate groups.

The polyesters according to the invention may contain the units I to III in statistical distribution, in segments or in blocks. In the case of component I, it is important to remember that relatively long blocks can greatly increase the melting point and the melt viscosity of the polyesters.

The melt viscosity of the polyesters according to the invention, as measured above the transition temperature—determined by DSC—from the crystalline to the liquid-crystal phase (normally between 200° and 350° C.) using a nozzle having a length-to-diameter ratio of 20 at a shear rate of $10^{-3} s^{-1}$, is generally in the range from 2 to 2000, preferably in the range from 5 to 1000 and more preferably in the range from 10 to 500 Pas.

The polyesters according to the invention may be prepared in various ways by reaction of the diphenols or reactive derivatives thereof, for example $C_1$–$C_3$ acyl derivatives, with the dicarboxylic acids or reactive derivatives thereof, for example dihalides or diesters, optionally in the presence of branching agents, chain terminators and/or catalysts.

The preferred synthesis process is the reaction of the acetylated, aromatic hydroxy compounds, which may also be produced in situ, with the aromatic carboxylic acids at temperatures in the range from about 160° to 400° C. using a typical catalyst for such reactions, optionally under reduced pressure.

Another preferred synthesis process is the reaction of the phenyl esters of the aromatic carboxylic acids, which may also be produced in situ, with the diphenols at temperatures in the range from about 160° to 400 C using a typical catalyst for such reactions, optionally under reduced pressure.

Carbonate groups may be introduced by using diphenyl carbonate.

The polyesters according to the invention may be prepared at temperatures in the range from about 160° to 400° C., the reaction generally being started at a low temperature and the temperature being continuously increased as the reaction progresses. In the event of a fall in the reaction velocity, a vacuum may be applied, the pressure preferably being reduced from normal pressure to around 0.1 mbar.

The product obtained may be hardened - preferably in an oxygen atmosphere or an inert gas atmosphere (nitrogen, noble gas), optionally with addition of up to 25% by weight sulfur and preferably up to 5% by weight sulfur—at a temperature in the range from about 200° to 350° C. After hardening, the polyesters according to the invention show distinctly improved resistance to chemicals, as reflected in their stability to p-chlorophenol.

The starting compounds are generally used in such quantities that the ratio of carboxyl to hydroxy functions is from 1:0.95 to 1.05, preferably from 1:0.98 to 1.02 and, more preferably, 1:1.

The reactions may be carried out in the melt or in inert high-boiling solvents.

Preferred catalysts for the polycondensation are Lewis acids and hydrohalic acids; oxides, hydrides, hydroxides, halides, alcoholates, phenolates, salts of inorganic and organic acids (preferably carboxylic acid salts), complex salts or mixed salts of the alkaline earth metals, magnesium, calcium; of the secondary group metals, such as vanadium, titanium, manganese, cobalt, nickel, zinc, lanthanum, cerium, zirconium, or of the elements of other groups of the periodic system, such as germanium, tin, lead and antimony, or even the alkali metals or alkaline earth metals themselves, more especially sodium. Suitable catalysts are sodium hydroxide, lithium acetate, magnesium acetate, cobalt acetate, zinc acetate, calcium benzoate, magnesium acetyl acetonate, zinc acetyl acetonate, vanadyl-$C_1$–$C_8$-alkoxides, titanium alkoxides, such as titanium tetrabutylate, titanium tetrapropylate, alkoxy titanium silicates, zirconium butylate, zirconium propylate, titanium tetraphenolate, sodium phenolate, germanium dioxide, antimony trioxide, dialkyl and diaryl tin oxide, dibutyl tin diacetate and dibutyl dimethoxy tin. Particularly preferred catalysts are magnesium, manganese, sodium, potassium and zinc acetate, titanium tetrabutylate, titanium tetrapropylate and/or sodium phenolate. The catalysts are used in quantities of preferably 0.001 to 1% by weight and more preferably 0.01 to 0.2% by weight, based on the total weight of monomers used.

By virtue of their relatively low melt viscosity, the linear, thermotropic polyesters according to the invention may be processed as thermoplastics to injection-molded forces generated during processing orientate the molecule to an extent dependent largely on the strength of those forces. In addition, the linear, thermotropic polyesters according to the invention show pronounced pseudoplasticity, i.e. their melt viscosity decreases greatly with increasing shear forces. Suitable processing techniques are injection molding, extrusion, compression molding and melt spinning.

Moldings of high tensile strength, high heat resistance and high dimensional stability can be produced from the polyesters according to the invention. Since the polyesters are highly resistant to chemicals, particularly after hardening, they are particularly suitable for the production of:
electrical articles, such as insulators, printed circuits, plugs, fittings and encapsulations of integrated circuits,
parts for chemical engineering equipment such as, for example, pipes, vessel linings, rotors, sliding fibers and seals, parts of interior fittings for aircraft,
parts for medical equipment.

However, the polyesters according to the invention may also be used—in powder form or in the form of dispersions —as coating compositions. They are also eminently suitable for the production of reinforced or filled molding compounds having a reinforcing material and/or filler content of from about 5 to 65% by weight, based on reinforced and/or filled molding compound.

The present invention also relates to the use of the new linear, thermotropic polyesters for the production of moldings, filaments, fibers and films.

EXAMPLES

The percentages in the following Examples are percentages by weight.

The notched impact strength $a_k$ was tested on standard small test bars in accordance with DIN 53 453 (ISO/R 179) at 23° C. using 10 test specimens in each case. The elasticity modulus in tension was measured in accordance with DIN 53 455 (ISO/R 527). Heat resistance was determined in accordance with DIN 53 460 (Vicat A softening point)) using a point placed on a test specimen under a load of 1 kg/mm$^2$ and at a heating rate of 10° C./minute.

EXAMPLE 1

The following substances were weighed into a nitrogen-purged, thoroughly heated melt condensation apparatus consisting of a 1 liter face-ground vessel with a face-ground cover, a stirrer, a nitrogen inlet and a fractionating column:
119.65 g=0.44 mol thiophenyl terephthalic acid
23.06 g=0.29 mol hydroquinone
27.07 g=0.15 mol 4,4′-dihydroxydiphenyl
122.35 g=0.89 mol p-hydroxybenzoic acid
188.68 g=1.85 mol acetic anhydride
0.04 g=germanium dioxide.

The reaction mixture was heated by means of a salt bath to 185° C. in a gentle stream of nitrogen. The temperature was then increased to 235° C. over a period of 1 hour, acetic acid distilling off. After 1.5 hours, the temperature was increased to 280° C. and more acetic acid distilled off. After 1.5 hours, the elimination of acetic acid was completed by reducing the pressure to 12 mbar and increasing the temperature to 300° C. over a period of 1 hour. After cooling, a beige-colored polyester was obtained (yield: 209.7 g=95.2% of the theoretical).

Under a polarization microscope, an anisotropic melt was observed above 195° C.

The intrinsic viscosity in p-chlorophenol, as measured at 45° C. and at a concentration of 5 g/l, was 3.04 dl/g. The softening temperature was 127° C. The E-modulus in tension was 14 750 MPa and the tensile strength 126 MPa.

EXAMPLE 2

Hardening of a polyester containing thiophenyl terephthalic acid units:
A polyester consisting of
33 mol-% thiophenol terephthalic acid
22 mol-% hydroquinone
11 mol-% 4,4′-dihydroxydiphenyl
67 mol-% p-hydroxybenzoic acid
(intrinsic viscosity 2.13 dl/g, as measured in p-chlorophenol at 45° C.) was hardened under various conditions at 300° C. The resulting improvement in resistance to chemicals is reflected in the reduction in the solubility of the hardened polyester in p-chlorophenol (Table 1).

TABLE 1

Hardening of a polyester containing phenylthioterephthalic acid units

| Time [h] | Atmosphere[1] | | | |
|---|---|---|---|---|
| | $N_2$ | Air | $N_2$[2] | Air[2] |
| 0 | 0 | 0 | 0 | 0 |
| 0.5 | 0 | 0.4 | 0.1 | 0.2 |
| 1 | 0 | 0.2 | 0.2 | 0.1 |
| 2 | 0.8 | 72.3 | 0.3 | 27.4 |
| 4 | 0.8 | 43.0 | 40.0 | 86.6 |
| 8 | 2.1 | 44.6 | 85.3 | 98.2 |

[1]Fraction insoluble in p-chlorophenol in %
[2]Addition of 5% by weight sulfur

EXAMPLE 3

The following substances were weighed into a nitrogen-purged, thoroughly heated melt condensation apparatus consisting of a 250 ml face-ground vessel with a face-ground cover, a stirrer, a nitrogen inlet and a fractionating column:
27.43 g=0.10 mol thiophenyl terephthalic acid,
19.42 g=0.10 mol hydroquinone bis-acetate
0.01 g=magnesium oXide The reaction mixture was heated to 270° C. by means of a salt bath in a gentle stream of nitrogen. After 1 hour, the temperature was increased to 300° C., acetic acid distilling off. After 30 minutes, the temperature was increased to 320° C. and more acetic acid distilled off. By reducing the pressure to 1 mbar, the elimination of acetic acid was completed in 20 minutes. After cooling, a beige-colored polyester was obtained (yield: 34.0 g=97.6% of the theoretical).

Under a polarization microscope, an anisotropic melt was observed above 330° C.

The intrinsic viscosity in trifluoroacetic acid/methylene chloride (1:4 parts by volume), as measured at 20° C. and at a concentration of 2 g/l, was 0.97 dl/g.

The softening point was 290° C.

EXAMPLE 4

The following substances were weighed into a nitrogen-purged, thoroughly heated melt condensation apparatus consisting of a 250 ml face-ground vessel with a face-ground cover, a stirrer, a nitrogen inlet and a fractionating column:
30.87 g=0.10 mol p-chlorothiophenyl terephthalic acid,
19.42 g=0.10 mol hydroquinone bis-acetate
0.01 g=magnesium oxide The reaction mixture was heated to 250° C. by means of a salt bath in a gentle stream of nitrogen. After 15 minutes, the temperature was increased to 290° C., acetic acid distilling off. The temperature was increased to 310° C. after 2 hours and more acetic acid distilled off. By reducing the pressure to 1 mbar, the elimination of acetic acid was completed in 30 minutes. After cooling, a beige-colored polyester was obtained (yield: 32.3 g=84% of the theoretical).

Under a polarization microscope, an anisotropic melt was observed above 300° C.

EXAMPLE 5

The following substances were weighed into a nitrogen-purged, thoroughly heated melt condensation apparatus consisting of a 250 ml face-ground vessel with a face-ground cover, a stirrer, a nitrogen inlet and a fractionating column:
28.83 g=0.10 mol p-methyl thiophenyl terephthalic acid,
19.42 g=0.10 mol hydroquinone bis-acetate
0.01 g=magnesium oxide The reaction mixture was heated to 250° C. by means of a salt bath in a gentle stream of nitrogen. The temperature was increased to 290° C. over a period of 15 minutes, acetic acid distilling off. After 45 minutes, the temperature was increased to 300° C. and more acetic acid distilled off over a period of 30 minutes. By reducing the pressure to 1 mbar, the elimination of acetic acid was completed in 30 minutes. After cooling, a beige-colored polyester was obtained (yield: 34.8 g=96.0% of the theoretical).

Under a polarization microscope, an anisotropic melt was observed above 315° C.

The intrinsic viscosity in trifluoroacetic acid/methylene chloride (1:4 parts by volume), as measured at 20° C. and at a concentration of 2 g/l, was 0.93 dl/g.

The softening point was 250° C.

EXAMPLE 6

The following substances were weighed into a nitrogen-purged, thoroughly heated melt condensation apparatus consisting of a 250 ml face-ground vessel with a face-ground cover, a stirrer, a nitrogen inlet and a fractionating column:
32.44 g=0.10 mol β-thionaphthyl terephthalic acid,
19.42 g=0.10 mol hydroquinone bis-acetate
0.01 g=magnesium oxide The reaction mixture was heated to 280° C. by means of a salt bath in a gentle stream of nitrogen. The temperature was increased to 300° C. over a period of 15 minutes, acetic acid distilling off. After 30 minutes, the elimination of acetic acid was completed in 30 minutes by reducing the pressure to 1 mbar. After cooling, a beige-colored polyester was obtained (yield: 34.1 g=85% of the theoretical).

Under a polarization microscope, an anisotropic melt was observed above 250° C.

The intrinsic viscosity in trifluoroacetic acid/methylene chloride (1:4 parts by volume), as measured at 20° C. and at a concentration of 2 g/l, was 0.49 g/l.

The softening point was 242° C.

EXAMPLE 7

The following substances were weighed into a nitrogen-purged, thoroughly heated melt condensation apparatus consisting of a 250 ml face-ground vessel with a face-ground cover, a stirrer, a nitrogen inlet and a fractionating column:
27.43 g=0.10 mol β-thiophenyl terephthalic acid,
20.82 g=0.10 mol methyl hydroquinone bis-acetate,
0.01 g=magnesium oxide The reaction mixture was heated to 280° C. by means of a salt bath in a gentle stream of nitrogen. The temperature was increased to 300° C. over a period of 15 minutes, acetic acid distilling off, after 2 hours, the elimination of acetic acid was completed in 30 minutes by reducing the pressure to 1 mbar. After cooling, a beige-colored polyester was obtained (yield: 29.6 g=85.0% of the theoretical).

Under a polarization microscope, an anisotropic melt was observed above 265° C.

The intrinsic viscosity in trifluoroacetic acid/methylene chloride (1:4 parts by volume), as measured at 20° C. and at a concentration of 2 g/l, was 0.79 g/l.

The softening point was 208° C.

EXAMPLE 8

The following substances were weighed into a nitrogen-purged, thoroughly heated melt condensation apparatus consisting of a 250 ml face-ground vessel with a face-ground cover, a stirrer, a nitrogen inlet and a fractionating column:
27.43 g=0.10 mol β-thiophenyl terephthalic acid,
19.42 g=0.10 mol hydroquinone bis-acetate,
0.01 g=magnesium oxide The reaction mixture was heated to 280° C. by means of a salt bath in a gentle stream of nitrogen. The temperature was increased to 300° C. over a period of 15 minutes, acetic acid distilling off. After 2 hours, the elimination of acetic acid was completed in 30 minutes by reducing the pressure to 1 mbar. After cooling, a beige-colored polyester was obtained (yield: 49.3 g=83.8% of the theoretical).

Under a polarization microscope, an anisotropic melt was observed above 290° C.

The intrinsic viscosity in trifluoroacetic acid/methylene chloride (1:4 parts by volume), as measured at 20° C. and at a concentration of 2 g/l, was 2.01 g/l.

The softening point was 140° C.

EXAMPLE 9

The following substances were weighed into a nitrogen-purged, thoroughly heated melt condensation apparatus consisting of a 250 ml face-ground vessel with a face-ground cover, a stirrer, a nitrogen inlet and a fractionating column:
27.43 g=0.10 mol β-thiophenyl terephthalic acid,
19.42 g=0.10 mol hydroquinone bis-acetate,
54.05 g=0.10 mol p-acetoxybenzoic acid,
0.01 g=magnesium oxide The reaction mixture was heated to 280° C. by means of a salt bath in a gentle stream of nitrogen. The temperature was increased to 300° C. over a period of 15 minutes, acetic acid distilling off. After 2 hours, the elimination of acetic acid was completed in 60 minutes by reducing the pressure to 1 mbar. After cooling, a beige-colored polyester was obtained (yield: 65.4 g=86.2% of the theoretical).

Under a polarization microscope, an anisotropic melt was observed above 165° C.

The intrinsic viscosity in trifluoroacetic acid/methylene chloride (1:4 parts by volume), as measured at 20° C. and at a concentration of 2 g/l, was 0.97 g/l.

The softening point was 149° C.

We claim:

1. Thermotropic aromatic polyester containing recurring units corresponding to the following formulae

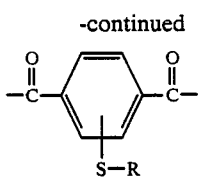

in which
- Ar¹ and Ar² are difunctional aromatic radicals containing 8 to 16 C atoms, in which at least 90 mol-% of the chain-extending bonds are coaxially or parallel-opposed and at most 10 mol-% are angled, these radicals optionally being substituted by 1 to 4 $C_1$-$C_4$ alkoxy groups and/or 1 to 4 halogen atoms, and
- is an aryl radical containing 6 to 18 carbon atoms, a p-alkylphenyl radical containing 7 to 11 carbon atoms or a p-halophenyl radical, characterized in that the molar ratio of I to II is 0 –85:1-00–15 and the molar ratio of II to III is 1– 95:1–1.05.

2. Polyesters as claimed in claim 1, characterized in that the molar ratio of I to II is 50–75:50–25.

3. Polyesters as claimed in claim 1, characterized in that the radicals of the recurring units of formula (II) are selected from 1,4-phenylene radicals and 4,4'-biphenylene radicals.

4. Polyesters as claimed in claim 1, characterized in that the recurring units of formula (I) are residues of 4-hydroxybenzoic acid.

5. Polyesters as claimed in claim 1, characterized in that the radicals of the recurring units of formula (III) are selected from residues of thiophenyl terephthalic acid, p-chlorothiophenyl terephthalic acid, p-methyl thiophenyl terephthalic acid and β-thionaphthyl terephthalic acid.

6. Polyesters as claimed in claim 1, characterized in that the radicals of the recurring units of formula (III) are residues of thiophenyl terephthalic acid.

7. A process for the production of thermotropic aromatic polyester as claimed in claim 1, comprising reacting hydroxy carboxylic acids, diphenols and substituted terephthalic acids or reactive derivatives thereof, optionally in the presence of chain terminators, branching agents and catalysts, at temperatures of 160° to 350° C., optionally under reduced pressure.

* * * * *